(12) United States Patent
Costin et al.

(10) Patent No.: US 11,163,303 B2
(45) Date of Patent: Nov. 2, 2021

(54) SHARING SENSOR DATA BETWEEN MULTIPLE CONTROLLERS TO SUPPORT VEHICLE OPERATIONS

(71) Applicant: Nvidia Corporation, Santa Clara, CA (US)

(72) Inventors: Mark Costin, Santa Clara, CA (US); Zoran Nikolic, Santa Clara, CA (US); Ram Ganapathi, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 347 days.

(21) Appl. No.: 16/273,707

(22) Filed: Feb. 12, 2019

(65) Prior Publication Data
US 2019/0250611 A1 Aug. 15, 2019

Related U.S. Application Data

(60) Provisional application No. 62/629,822, filed on Feb. 13, 2018.

(51) Int. Cl.
*G05D 1/00* (2006.01)
*G05B 9/03* (2006.01)
(Continued)

(52) U.S. Cl.
CPC ....... *G05D 1/0088* (2013.01); *B60R 16/0231* (2013.01); *G05B 9/03* (2013.01);
(Continued)

(58) Field of Classification Search
CPC .... G05D 1/0088–0278; B60R 16/0231; G05B 9/03; H04N 7/102–181
See application file for complete search history.

(56) References Cited

U.S. PATENT DOCUMENTS

2014/0247355 A1* 9/2014 Ihlenburg ................. H04N 7/18
348/148
2015/0336521 A1* 11/2015 Tofilescu ........... G06K 9/00791
382/104
(Continued)

OTHER PUBLICATIONS

U.S. Appl. No. 62/578,775, filed Oct. 2017. (Year: 2017).*
(Continued)

*Primary Examiner* — Calvin Cheung

(57) ABSTRACT

This disclosure presents an assisted driving vehicle system, including autonomous, semi-autonomous, and technology assisted vehicles, that can share sensor data among two or more controllers. A sensor can have one communication channel to a controller, thereby saving cabling and circuitry costs. The data from the sensor can be sent from one controller to another controller to enable redundancy and backup in case of a system failure. In another embodiment, sensor data from more than one sensor can be aggregated at one controller prior to the aggregated sensor data being communicated to another controller thereby saving bandwidth and reducing transmission times. The sharing of sensor data can be enabled through the use of a sensor data distributor, such as a converter, repeater, or a serializer/deserializer set located as part of the controller and communicatively coupled to another such device in another controller using a data interface communication channel.

38 Claims, 9 Drawing Sheets

(51) Int. Cl.
  *B60R 16/023* (2006.01)
  *G05D 1/02* (2020.01)
  *H04N 7/18* (2006.01)
  *H04N 7/10* (2006.01)

(52) U.S. Cl.
  CPC ......... *G05D 1/0242* (2013.01); *G05D 1/0246* (2013.01); *G05D 1/0255* (2013.01); *G05D 1/0257* (2013.01); *G05D 1/0278* (2013.01); *H04N 7/102* (2013.01); *H04N 7/181* (2013.01)

(56) References Cited

U.S. PATENT DOCUMENTS

2018/0109755 A1* 4/2018 Vaid ........................ H04N 7/102
2019/0132555 A1* 5/2019 Chu ....................... G01S 17/931

OTHER PUBLICATIONS

Patrick Divine, "Serialization and Deserialization", all pages, published Oct. 15, 2019, https://betterprogramming.pub/serialization-and-deserialization-ba12fc3fbe23?gi=e1fb9e05cebc (Year: 2019).*

* cited by examiner

SHARING SENSOR DATA BETWEEN MULTIPLE CONTROLLERS TO SUPPORT VEHICLE OPERATIONS

CROSS-REFERENCE TO RELATED APPLICATION

This application claims the benefit of U.S. Provisional Application Ser. No. 62/629,822, filed by Mark Costin, et al. on Feb. 13, 2018, entitled "SYSTEMS AND METHODS FOR SHARING CAMERA DATA BETWEEN PRIMARY AND BACKUP CONTROLLERS IN AUTONOMOUS VEHICLE SYSTEMS," commonly assigned with this application and incorporated herein by reference in its entirety.

TECHNICAL FIELD

This application is directed, in general, to processing sensor data in a vehicle and, more specifically, to sharing sensor data between multiple controllers in the vehicle.

BACKGROUND

Many approaches for autonomous or semi-autonomous vehicles and vehicles with assistive driving features use sensors and computer systems to monitor a vehicle's environment and control the vehicle to safely move between locations. For such vehicle operations, it is important that sensor data, such as from cameras and other sensors, be transmitted to the computing system in as close to real time as possible. This is to allow the computing system to analyze and react to the sensor data collected to improve the vehicle's ability to maintain safety and control in its environment.

Typically, a sensor is connected to at least one computing system of a vehicle, such as an embedded control unit (ECU). There is usually more than one ECU on the vehicle to provide an opportunity for connecting proximate sensors to a nearby ECU thereby reducing cable runs. In addition, more than one ECU can provide for redundancy and failover support of vehicle operations in case one ECU fails or stops working for any reason. Each ECU needs to receive the same sensor data from a sensor in as close to real time as possible to be able to provide sufficient failover support. A sensor could have multiple outputs to provide the sensor data to multiple ECUs. The multiple outputs, however, require that the sensors include additional electronic circuitry and cabling from the multiple outputs to each of the ECUs. This can increase the cost of the sensors and the cost of installing cables in the vehicles. A more efficient way for connecting a sensor to more than one ECU would be beneficial in keeping vehicle costs lower while maintaining the appropriate level of failure, such as meeting the appropriate automotive safety integrity level (ASIL).

SUMMARY

In one aspect, a first controller for processing sensor data for a vehicle is disclosed. In one embodiment, the first controller includes: (1) a processor configured to process a first sensor data generated by at least one sensor, and (2) a sensor data distributor configured to receive the first sensor data through a first link of a first data interface, convert the first sensor data for transmission through a second data interface, transmit the converted first sensor data to the processor employing a first link of the second data interface, and transmit the sensor data to a second controller through a second link of the first data interface, wherein the first data interface comprises a serialized data interface and the second data interface comprises a deserialized data interface.

In another aspect, a vehicle control system of a vehicle is disclosed. In one embodiment, the vehicle control system includes: (1) a first controller, located as part of the vehicle, comprising a first processor, and communicatively connected to a first set of sensors which generate a first sensor data, and (2) a second controller, located as part of a vehicle, comprising a second processor, wherein the first and second processors are configured to process sensor data and the first controller transmits the first sensor data to the second controller, and wherein the second controller transmits the second sensor data to the first controller.

In another aspect, a method for communicating sensor data between controllers of an advanced driver assistance (ADA) system is disclosed. In one embodiment the method includes: (1) receiving, in a first controller of a vehicle, first sensor data generated by a first set of sensors and second sensor data generated by a second set of sensors, (2) converting the first and second sensor data for transmission through a first data interface, and (3) transmitting the first and second sensor data employing the first data interface to a first system on a chip (SoC) of the first controller, wherein the second sensor data is transmitted to the first controller from a second controller of the vehicle, and the second controller has a position that is physically diverse from a position of the first controller in the vehicle.

BRIEF DESCRIPTION

Reference is now made to the following descriptions taken in conjunction with the accompanying drawings, in which.

DETAILED DESCRIPTION

Figure 1:
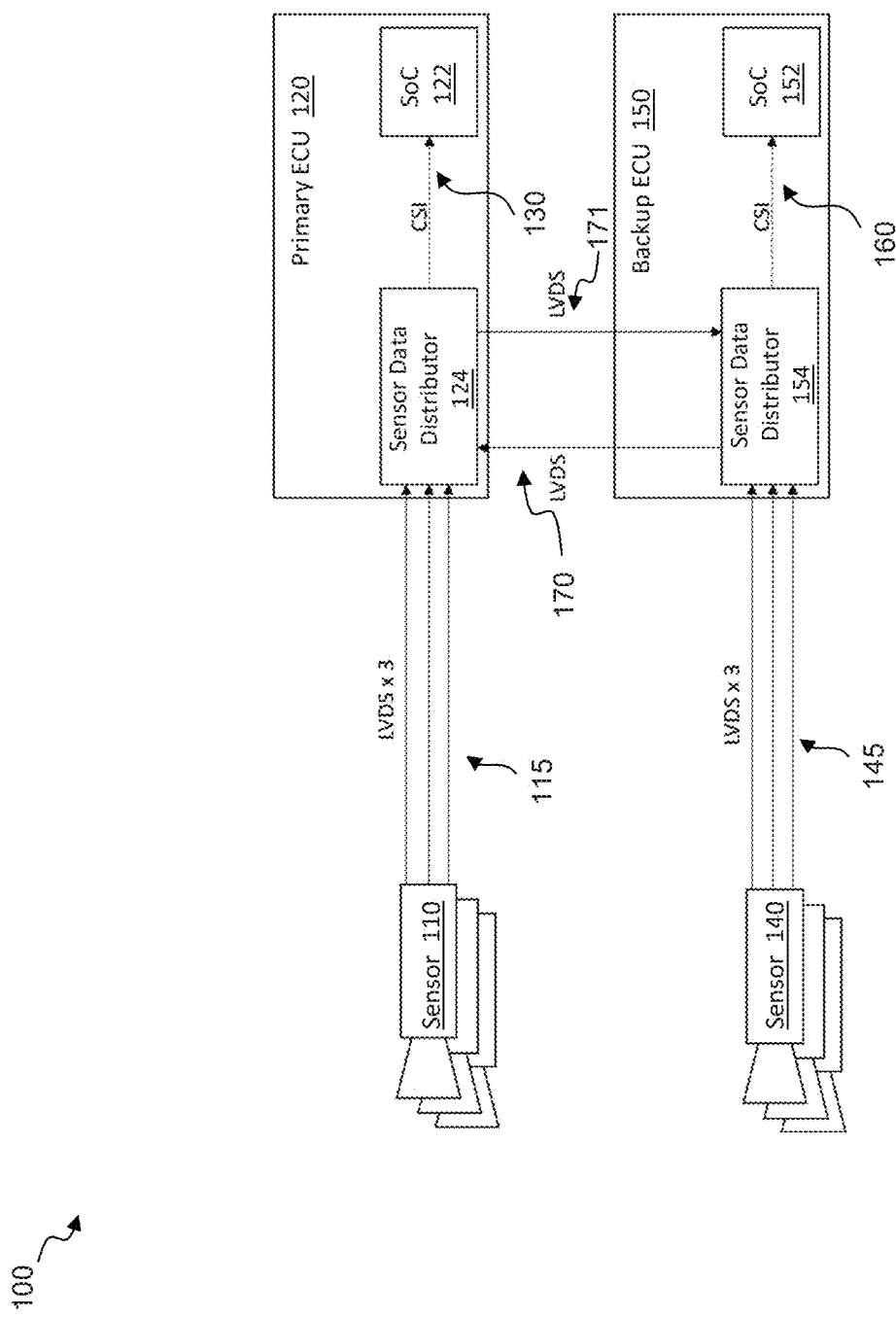
FIG. 1 is an illustration of a diagram of an example system to share sensor data between controllers using a sensor data distributor.

Vehicles can use different types of sensors and computing systems to monitor environmental conditions and to adjust the vehicle to maintain control and safety. For example, vehicles may be able to sense if a tire slips on wet pavement and then adjust the drive power delivered to that wheel so the driver can maintain control over the vehicle, or the vehicle may have anti-lock brakes where the vehicle controls the actual braking mechanism based on requests or commands from the operator, e.g., pressing the brake pedal. Such vehicles are often referred to as a technology assisted vehicle. With more sophisticated technology, some vehicles are able to partially operate on their own and are known as semi-autonomous vehicles. For example, a semi-autonomous vehicle can have a combination of lane keep assistance and cruise control that enables a driver to operate the vehicle with hands-off of the steering wheel while still requiring that the driver pay attention. An autonomous vehicle is another type of vehicle that uses sensor data to operate on its own with little or no driver interaction.

In order for these various types of vehicles to operate successfully, the vehicles need to receive data on the condition of the vehicle and the condition of the surrounding environment. Non-limiting examples of such conditions include the temperature outside the vehicle, the roadway conditions (icy, wet, dry), another vehicle or object approaching, and the tire pressure. These conditions can be detected by sensors arrayed around the vehicle. For example, each tire can have a pressure sensor, a thermometer can measure the temperature, sensors can monitor the acceleration and brake pedal positions, and a series of cameras can be arrayed around the vehicle to detect objects, signs, lights, and vehicles. Other types of sensors can include, but are not limited to, ultrasonic sensors, stereo cameras, fisheye or wide-view cameras, surround cameras, high-resolution cameras, artificial intelligence cameras, infrared sensors including detectors and cameras, radio detection and ranging (RADAR) systems, light detection and ranging (LiDAR) systems, microphones, brake sensors, and global positioning systems (GPS).

The sensor data should be collected and transmitted from the sensor to a computing system to allow the collected data to be analyzed, combined with other sensor data, and used in further decision making by the computing system to operate the vehicle. For example, if a camera detects a red traffic light, the information needs to be quickly transmitted to the computing system that controls the vehicle so that the computing system can issue the proper commands and instructions to slow and stop the vehicle. The sensor data can be transmitted in real-time or near real time, minimizing delays between the capture of the sensor data and the transmission of that data to a computing system. In addition, for certain types of sensors, there is a preference for the sensor data to be collected at substantially the same time from two or more of those sensors. For example, images can be captured from two or more cameras and then stitched together using a conventional stitching algorithm to generate a wider field of view image than would be possible from a single camera. Thus, the multiple images can provide a 360-degree view perspective.

This disclosure describes a way to share the sensor data from various sensors around a vehicle with more than one computing system. This can be valuable in case one of the computing systems is damaged or fails to operate properly. Merely attaching a cable from each sensor to each controller can drastically raise the cost of producing the vehicle, especially as the number of sensors increase on a vehicle. Sharing the sensor data can be better achieved by splitting the sensor data between more than one computing system and then having each computing system forward the sensor data to one or more other computing systems.

The computing systems, i.e., controllers, require additional measures to account for system failures, especially as vehicle autonomy increases. This is typically addressed by incorporating at least two computing systems, e.g., a primary and a backup controller, or a front and rear controller, to provide operational redundancy and/or load balancing in the event a controller fails or stalls. To avoid common-cause failures due to physical location, such as vibration, water intrusion, or collision with an object or debris, these controllers are usually located in physically diverse locations from one another. This can present an additional complication since the data acquired by the array of sensors—typically positioned around a perimeter and throughout an interior of a vehicle—must therefore be routed to additional destinations, and over potentially longer distances. Controllers can contain a variety of discrete components, e.g., one or more processors, power supplies, converters, repeaters, splitters, serializers, deserializers, transceivers, modems, communicators, memory, cache, and other circuit components. A controller in an autonomous or semi-autonomous vehicle can be an autonomous vehicle control board (AVC).

The actual processing of a large portion of the sensor data in a vehicle is generally performed by one or more system on a chip (SoC) in the controller. The controller can also include other processors and circuit functionality, such as transceivers, modems, one or more central processing units (CPUs) and graphics processing units (GPUs). The processing can include, for example, analyzing the camera data for objects and vehicles moving in front of the camera, determining a distance to the object or vehicle, and determining if a road sign was captured by the camera. This processing can lead to other analyzations and decisions by the controller and other vehicle systems, such as if a stop sign were detected and the vehicle should come to a stop.

One approach for communicating sensor data to the SoC of a controller uses multiple physical communication links—each link connecting a sensor directly to a controller via a cable or wire—to transfer the sensor data as signals. Each link can instantiate a data interface to handle the communication between the sensor and the controller. Data interfaces can include specifications for transmission protocols, data formatting, and communication signal handling. Differential serial communications protocols can be used. Common data interface standards are the low-voltage differential signaling (LVDS) interface, the gigabit Ethernet (GbE) interface, and the controller area network (CAN) interface. Other data interfaces can be used, such as open source, private, and proprietary data interfaces.

Links are instantiations of the data interfaces incorporating a physical transmission component, for example, a coaxial cable, a twisted pair wire, a fiber optic cable, a circuit trace (trace), and other physical transmission components. In some embodiments, links can include communication channels and communication virtual channels, such as having one virtual channel over a link for each sensor connected to that link. Buses can be used as links to allow various components to exchange data with each other as well as with input and/or output devices. For example, the exchange of data, e.g., commands, responses, and information, can be exchanged with one or more input and/or output devices including displays, sensors, keyboards, and user interface devices. The bus can comprise one or more bus standards, switches, and networks, including but not limited to, Ethernet, CAN, I2C buses, or peripheral component interconnect express (PCIe) buses.

Typically, sensors of a specific type use a similar type of link-instantiated data interface in a particular vehicle to communicate with the controllers. It is possible to instantiate a link using more than one data interface; for example, a separate data interface can be used for each virtual channel included in the link. In other embodiments, links in a link set (multiple links logically or physically grouped together) can instantiate a different data interface, using the same or different data protocol for each data interface. Other combinations of links, data interfaces, and data protocols are possible as well.

There can be links between components of a controller as well. Since the components are typically grouped together on the controller as part of a circuit board, these links can be instantiated as traces. The data interface types used for the component links of a controller can provide significant advantages in bandwidth and performance that is typically unsuitable for communicating sensor data over longer distances, and in particular, across multiple circuit boards. These types of data interfaces can be, for example, a mobile industry processor interface (MIPI) interface, a camera serial interface (CSI), embedded display port (eDP), and display serial interface (DSI). Each data interface can support one or more data formats or data protocols. These data interfaces are designed for high speed and high data transmission over short distances and may not be conducive to be easily split into more than one signal.

This can be problematic since the controller can be located some distance away from the sensor or from another controller. Popular approaches have been devised that use a converter or a serializer at the sensor device to convert the data to a data interface that is easier to transmit over distance, making it possible to communicate the data using low power at high speeds to the processing controllers.

One such approach for data sharing between multiple physically diverse controllers connects each sensor with a single controller—usually the controller in greatest physical proximity to the sensor—using a first link-instantiated data interface. A second, different link such as Ethernet can be used as a bridge to communicate the data over the distance between the controllers, e.g., a bridging communication link. This requires the sensor data to be converted from the native processing data interface of the SoC to an Ethernet-compatible data interface prior to transmission. This is typically because the instantiated links between controllers, e.g., Ethernet, do not have enough bandwidth for communicating large amounts of data, such as camera frame data from the image capture device. This additional conversion can increase latencies and computation, and presents the potential risk of information loss due to compression.

Another conventional approach includes using a physical link to connect each sensor directly to each controller. This solution multiplies the number of links in the system for each controller used, and significantly increases the board size within each sensor, causing cost and packaging issues for each additional controller connection. With current design trends favoring increased sensor allocations, the accompanying increase in cost and space requirements can become prohibitively expensive.

As a solution to the problems noted above, the disclosure provides systems and methods for communicating sensor data quickly and reliably over physically diverse locations of a vehicle. The disclosure leads to multi-controller possibilities to ensure an extra level of redundancy during vehicle operation. The disclosure allows sensor data to be shared in a platform of a vehicle. Though automobiles are used as the example vehicle in the disclosure, vehicles as used herein are not limited to automobiles. Vehicles can also be trucks, motorcycles, boats, submarines, trains, airplanes, drones, helicopters, space craft, satellites, rockets, missiles, and other vehicles that can travel and carry something. The vehicle can travel on a street, road, highway, air, space, orbit, on top of water, under water, and in other environments.

In certain embodiments, the disclosure comprises multiple controllers at physically diverse positions in control systems for vehicles, to maintain control and sensor-processing capabilities in the event a localized, physical or electrical, disruption to a SoC of a primary controller arises. Embodiments of the disclosure instantiate and maintain links that communicate sensor data directly from sensors to one of the controllers, and bridging communication links that share the data between the controllers. The sensor data is communicated between sensors and between controllers using a data interface suited to transmission over distance, while intra-board components use an alternate data interface for processing and communicating sensor data.

The SoC preferably includes a general-purpose signal controller uncommitted to a specific role and controlled by software. In some embodiments, the SoC has a broad range of peripheral interfaces to enable communication, through the signal controller, with peripherals, sensors, audio codecs, power management systems, other SoCs, other processors, other components of the controller, and other devices. In an example using cameras, the SoC can receive input from cameras through the MIPI CSI, a standard high-speed serial interface. CSI, as defined by MIPI, consists of four differential data pairs plus one differential clock pair, and thus requires ten data channels with a ten-pin connector to carry over a distance. Transmitting data under such a specification over longer distances, e.g., such as 15 meters, can be prohibitive.

As a solution to this issue, one or more embodiments of the controller can be implemented using a sensor data distributor. The sensor data distributor includes circuitry, such as converters, serializers, deserializers, and repeaters, to aggregate, convert, forward, and transfer the input from sensors between data interfaces; for example camera data between the CSI data interface and other data interfaces more suitable for longer range transportation. The sensor data distributor can include various combinations of components and the components can be grouped together in various combinations for distributing sensor data employing various data interfaces. In one example, a sensor data distributor includes a converter having a serializer and a deserializer set (SerDes).

In addition to SoCs, the controllers can further include on-chip and off-chip storage and memory which may be comprised of one or more storage elements including RAM, SRAM, DRAM, VRAM, flash, hard disks, and other components and devices that can store at least one bit of data. The storage preferably includes on-chip storage, and may comprise L2 or L3 caches for use with the SoC or other processors, such as a CPU and/or a GPU.

Controllers can be implemented as various types of circuitry and control boards, such as an embedded control unit (ECU) or a microcontroller unit (MCU). An ECU or MCU can comprise integrated circuitry such as the SoC, stand-alone application specific integrated circuit (ASIC), or another type of processor. In a typical embodiment, the ECU or MCU is designed for an automotive safety integrity level (ASIL) D functional safety level. In one or more embodiments, one of the ECU or MCU can be designated to operate as a master controller for the system. In further embodiments, another ECU or MCU is designated to operate as a secondary controller, and is capable of assuming master control in the event the master controller is rendered non-operational, or if an operation is compromised. According to various embodiments, the primacy between the two or more controllers can be adjusted dynamically.

The SoCs are capable of chip-to-chip communication. Such communication may be either through a PCIe switch or direct, through a secure message layer connecting two distinct SoCs. When the SoCs are physically diverse relative to each other, e.g., on two separate control boards, implementations can include one or more sensor data distributors. The SoCs may be paired with each other directly through a high-speed NVLINK. NVLINK is a wire-based communications protocol serial multi-lane near-range communication link developed by Nvidia Corporation of Santa Clara, Calif. When configured for chip-to-chip communication, the system of two SoCs functions to some extent as if it were a single unified system. Each SoC can address the other SoC's DRAM and SysRAM.

If one of the SoCs fails for a variety of reasons, the other SoC can continue to operate. Because the SoCs are performing operations that are redundant to the operations that would have been performed by the failed SoC, autonomy and its associated critical functions can be maintained when one of the processors fails. In some example non-limiting implementations, the SoCs receive the same inputs or at least have access to the same inputs. For example, the SoCs may be connected to a common bus such as the CAN bus, or an arrangement of multiple redundant buses, and are thereby able to access the same information.

According to one or more embodiments, two or more SoCs may receive the same inputs through an exchange of data performed between components of a controller upon which the SoCs are implemented. As described herein, inputs may be directed to one of the plurality of SoCs under a pre-converted, e.g., serialized and/or interface. A sensor data distributor in each controller can aggregate the separate input threads and forward the aggregated input data to the sensor data distributor of the other controllers under the same, pre-converted data interface. In other embodiments, the sensor data distributor can convert the aggregated input data to a different output data interface that is used by the SoCs for processing. According to further embodiments, at least a portion of the sensor data distributor can be implemented as a SerDes.

Turning now to the figures, FIG. 1 is an illustration of a diagram of an example system 100 to share sensor data between controllers using a sensor data distributor, such as a sensor data distributor including a converter circuit. System 100 demonstrates one embodiment of the disclosure for sharing sensor data between at least two controllers. In a preferred embodiment, the controllers can be implemented as ECUs. Multiple sensor devices, or sensors, can be directly connected to one of multiple ECUs. The specific configuration can be an even or roughly even division of sensors allocated between each ECU. Other embodiments may allocate sensors between two or more ECUs based on the specific configuration, available resources, computational capacity, or other factors of the ECUs. As depicted in system 100, for example, multiple sensors may be grouped into two groups of equal or roughly equal numbers of cameras, each group being physically connected to either the designated primary ECU 120 or the designated backup ECU 150 via link set 115 or link set 145.

An advantage provided by such a configuration is that the number of links required under such an implementation is reduced by a factor corresponding to the number of ECUs in the system relative to conventional solutions that connect each sensor to each ECU. Sensors within the same group can be positioned at various locations, including being positioned at physically diverse locations, e.g., around a perimeter of a vehicle. According to preferred embodiments, sensors can be coupled to the nearest ECU to minimize the length of the link.

System 100 has multiple first sensors 110, a first set of sensors, communicatively connected to the primary ECU 120 via the link set 115 and multiple second sensors 140, a second set of sensors, communicatively connected to the backup ECU 150 via the link set 145. In some embodiments, the multiple first sensors 110 and multiple second sensors 140 can be cameras, and the sensor data can be camera data and can be processed according to an image or video processing data interface and protocol, including, but not limited to, CSI, DSI, and eDP. The primary ECU 120, in addition to a SoC 122, has a sensor data distributor 124. Similarly, the backup ECU 150, in addition to a SoC 152, has a sensor data distributor 154. Sensor data distributor 124 and sensor data distributor 154 are communicatively coupled over bridging communication link 170 from sensor data distributor 154 to sensor data distributor 124, and bridging communication link 171 from sensor data distributor 124 to sensor data distributor 154. Bridging communication links 170 and 171 can use a separate data interface and protocol from the other communication links.

The sensor data distributor 124 is used to connect the multiple first sensors 110 to the sensor data distributor 154. The sensor data distributor 154 is used to connect the multiple second sensors 140 to the sensor data distributor 124. At least one of the sensor data distributors 124 and 154 can be implemented as at least part of a converter or a SerDes. In some embodiments, sensor data distributors 124 and 154 can also include one or more data repeaters, data splitters, and data conversion circuitry. As shown in the illustrated embodiment, the link sets 115 and 145, and links 170 and 171 can be implemented using a LVDS data interface over a data communication medium, e.g., coaxial cable, twisted pair wire, circuit trace, and fiber optic cable. Link sets 115 and 145 are shown with multiple physical channels. In an alternate embodiment, multiple first sensors 110 and multiple second sensors 140 can be respectively linked to converters over one physical channel using multiple virtual channels.

According to a further embodiment, sensor data captured by the multiple first sensors 110 or multiple second sensors 140 can be initially converted (serialized) from a native sensor protocol in an individual serializer at each of the multiple first or second sensors 110 and 140, before transmission through the link sets 115 and 145. When the sensor data is received, the respective sensor data distributor 124 or sensor data distributor 154 operates as a de-serializer to convert the serialized data to a data interface that can be processed in the respective SoC 122 or SoC 152.

After the sensor data is received over the link sets 115 and 145, the respective sensor data distributor 124 or sensor data distributor 154 can also aggregate the received (serialized) sensor data and convert (de-serialize) the aggregated sensor data to a data interface that can be processed in one or more processors, which can collectively comprise the respective SoC 122 and SoC 152. In certain embodiments, the SoC 122 and SoC 152 can be specialized for a specific data interface. A suitable data interface can include, without limitation, a MIPI specification such as CSI and its derivatives. According to such embodiments, the aggregated sensor data can be converted in the respective sensor data distributor 124 or 154 to the respective SoC 122 or 152 data interface, e.g., CSI data, and transmitted to a CSI receiver in the respective SoC 122 or 152 over respective link 130 and 160. In such embodiments, the links 130 and 160 can be of various link types, such as a trace on a circuit board, and the links 130 and 160 can support CSI compliant data interfaces and can be a bus.

In further embodiments, the links 130 and 160 can support multiple virtual channels through their respective data interfaces, where each virtual channel corresponds to a particular sensor of the multiple first sensors 110 or multiple second sensors 140 coupled to the respective sensor data distributor 124 or 154. After receipt, the respective SoC 122 or 152 processes the converted sensor data and can generate control output to perform advanced driver assistance (ADA) and vehicle control functions, such as autonomous vehicle control functions.

Figure 2:
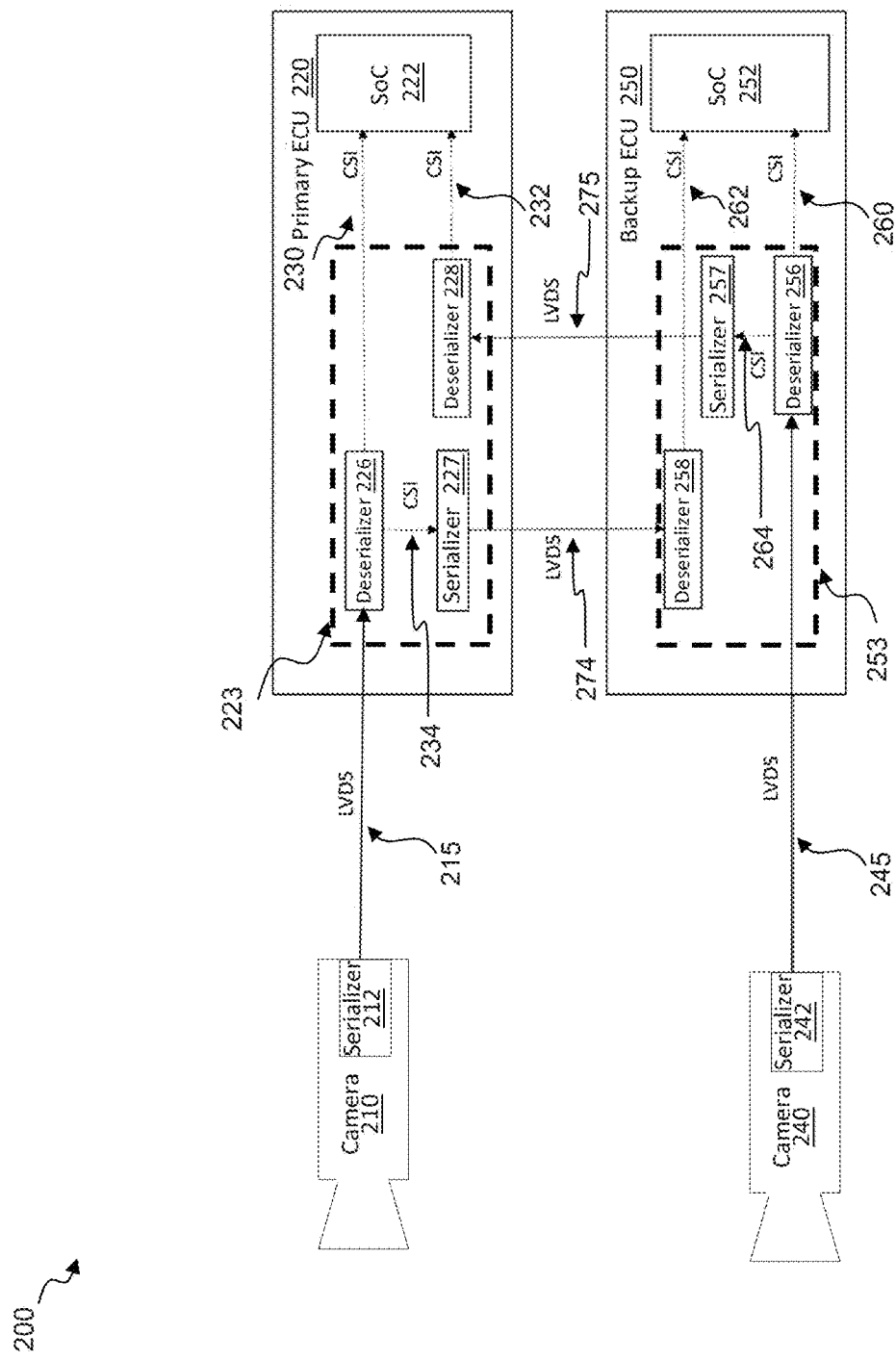
FIG. 2 is an illustration of a diagram of an example system to share sensor data using a serializer/deserializer set.

FIG. 2 is an illustration of a diagram of an example system 200 to share sensor data using a sensor data distributor having a SerDes. System 200 depicts an alternative approach for sharing sensor data between at least two ECUs. In FIG. 2, two sensor data distributors include deserializers that can each output two SoC-native data streams in replicate mode, and can be combined with a serializer to communicate off-board between two ECUs. These can be implemented as a SerDes with an additional deserializer, or as separate components. This has the advantage of requiring no modifications to existing designs for ECU boards that utilize deserializers for data conversion.

System 200 has a first camera 210 with a serializer 212, a second camera 240 with a serializer 242, a primary ECU 220, and a backup ECU 250. The first camera 210 is connected to the primary ECU 220 via a link 215 and the second camera 240 is connected to the backup ECU 250 via a link 245. The first camera 210 and the second camera 240 can be other types of sensors as well, for example, LiDAR, microphones, vehicle monitors such as tire pressure sensors, and other vehicle sensor types. Primary ECU 220 includes a SoC 222, a deserializer 226, a serializer 227, and a deserializer 228. Deserializer 226, serializer 227, and deserializer 228 can be grouped together as sensor data distributor 223. In other embodiments, sensor data distributor 223 can include the deserializers 226 and 228 or the deserializer 226 and serializer 227, with the other components included separately from sensor data distributor 223. Other combinations are possible as well.

Backup ECU 250 includes a SoC 252, a deserializer 256, a serializer 257, and a deserializer 258. Deserializer 256, serializer 257, and deserializer 258 can be grouped together as sensor data distributor 253. In other embodiments, sensor data distributor 253 can include the deserializers 256 and 258 or the deserializer 256 and serializer 257, with the other components included separately from sensor data distributor 253. Other combinations are possible as well.

The serializer 227 is communicatively connected to the deserializer 258 via a bridging communication link 274, and the deserializer 228 is communicatively connected to the serializer 257 via bridging communication link 275. The links 215 and 245, and the bridging communication links 274 and 275 can be implemented using a LVDS data interface over a data communication medium, e.g., coaxial cable, trace, fiber optic cable, or twister pair wire. The illustrated components of the primary ECU 220 are connected to each other using data interfaces 230, 232, and 234. The illustrated components of the backup ECU 250 are connected to each other using data interfaces 260, 262, and 264. The data interfaces 230, 232, 234, 260, 262, and 264 can be CSI compliant data interfaces, such as a CSI data compliant bus, for communicating CSI data between the respective connected components, though other data interfaces can be used as well. The data interfaces 230, 232, 234, 260, 262, and 264 can be implemented using, for example, a trace type of link The interconnects and communication links are similar to system 100 with the following differences.

First camera 210 communicates its sensor data to deserializer 226 using the serializer 212, included as part of first camera 210, over link 215. Deserializer 226 can produce two data interfaces for two different links, data interface 230 directed toward SoC 222 and data interface 234 directed toward the serializer 227. Serializer 227 can communicate the sensor data to deserializer 258 via bridging communication link 274. Deserializer 258 can communicate the sensor data to the SoC 252 via the data interface 262. Likewise, second camera 240 communicates its sensor data to deserializer 256 using the serializer 242, included as part of second camera 240, over link 245. Deserializer 256 can produce two data interfaces for two different links, data interface 260 directed toward SoC 252 and data interface 264 directed toward the serializer 257. Serializer 257 can communicate the sensor data to deserializer 228 via bridging communication link 275. Deserializer 228 can communicate the sensor data to the SoC 222 via data interface 232. The respective SoC 222 or 252 processes the converted sensor data and generates control output to perform ADA and vehicle control functions, such as autonomous vehicle control functions.

In the system 200 example, links are described for communication connections between separate devices or circuit boards. Data interfaces are described for communication connections between components on the same control board. This was done for mere descriptive purposes. Links are typically instantiations of implemented data interfaces, and data interfaces include a specification for data protocol or format, communication signaling, and other interface parameters.

Figure 3:
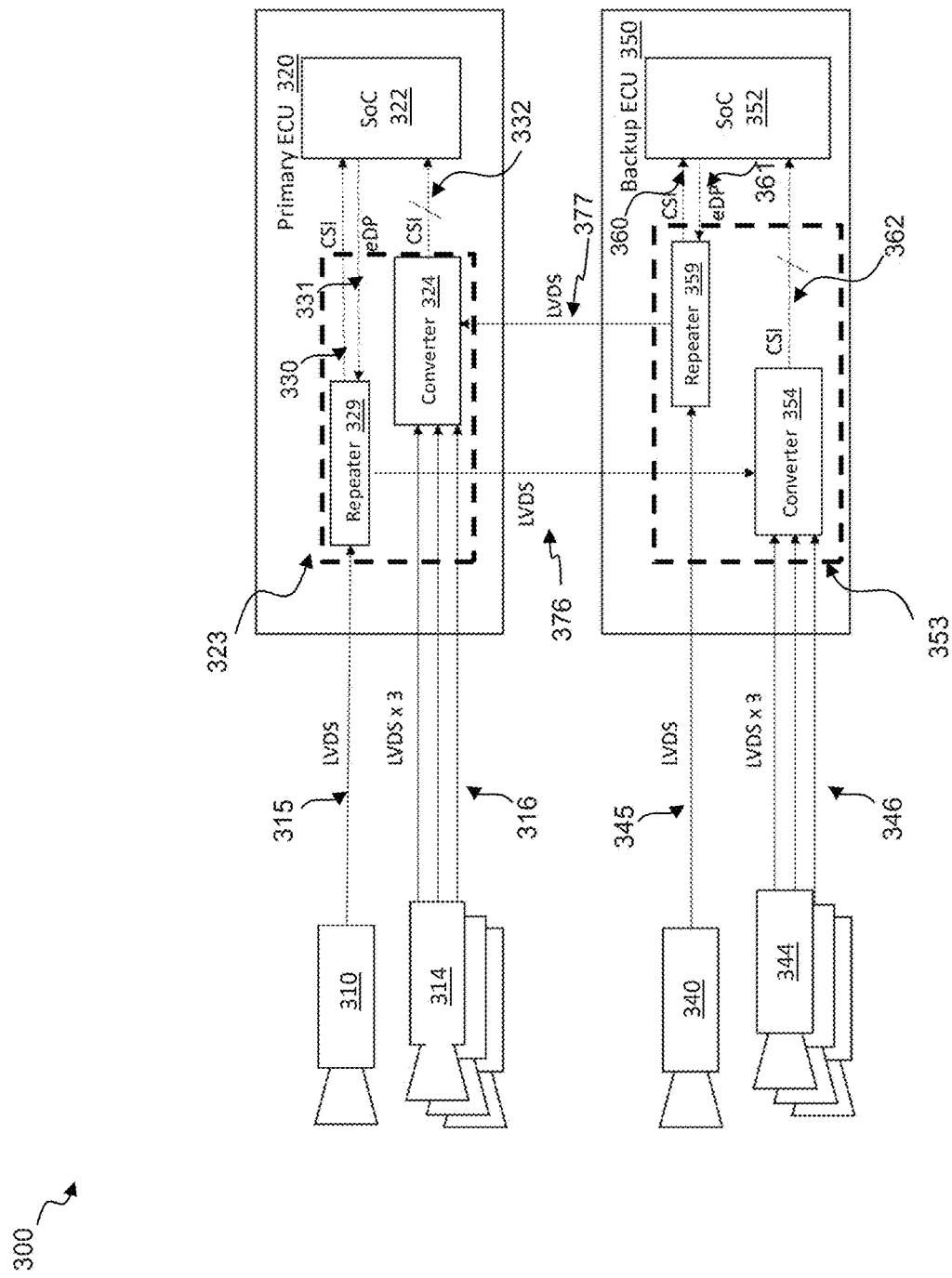
FIG. 3 is an illustration of a diagram of an example system to share sensor data using a repeater and converter.

FIG. 3 is an illustration of a diagram of an example system 300 to share sensor data using a repeater and converter. System 300 depicts an alternative approach for sharing sensor data between at least two ECUs. As depicted in system 300, each ECU is equipped with one or more repeaters, each of which is capable of receiving sensor data as input and outputting the data to a local SoC on the same ECU in a SoC-native data interface, and to an off-board component using a different data interface than the SoC-native data interface. In certain embodiments, the data communicated to the off-board component can use the same serialized data interface that was used to communicate the data from the sensors to the original receiving ECU, e.g., as a pass-through, and can be transmitted using a separate connecting link In a preferred embodiment, the off-board component includes a second, physically diverse ECU, and/or portions thereof, e.g., a converter of the ECU.

In one or more embodiments, a sensor can be connected to the repeater and not to the converter of the corresponding ECU. For example, as shown in system 300, sensor 310 has a communicative link 315 with repeater 329 of primary ECU 320, and is not connected with converter 324 of the primary ECU 320. Rather, the repeater 329 forwards sensor data received from sensor 310 to converter 354 of backup ECU 350 via bridging communication link 376. The repeater 329 also forwards sensor data from the sensor 310 to the SoC 322 via data interface 330, in this example, using the CSI data interface. The SoC 322 can communicate back to the repeater 329 via the data interface 331, in this example, using the eDP data interface. Converter 354 is configured to aggregate the sensor data from sensor 310 with sensor data collected from sensor set 344 via link set 346 before transmitting the aggregated sensor data to SoC 352 of the backup ECU 350 via data interface 362.

Similarly, sensor 340 has a communicative link 345 with repeater 359 of the backup ECU 350, and is not connected with the converter 354 of the backup ECU 350. Rather, the repeater 359 forwards sensor data received from sensor 340 to the converter 324 of the primary ECU 320 via bridging communication link 377. The repeater 359 also forwards sensor data from the sensor 340 to the SoC 352 via data interface 360, in this example, using the CSI data interface. The SoC 352 can communicate back to the repeater 359 via the data interface 361, in this example, using the eDP data interface. Converter 324 is configured to aggregate the sensor data from sensor 340 with the sensor data collected from sensor set 314 via link 316 before transmitting the aggregated sensor data via data interface 332, in this example, using the CSI data interface, to the SoC 322.

In one or more further embodiments, the repeater 329 can receive the sensor data from sensor set 314 from the SoC 322 via the data interface 331. Repeater 329 can aggregate and convert the sensor data received from sensor set 314 and sensor 310 before forwarding the aggregated sensor data to the converter 354 of the backup ECU 350. Similarly, the repeater 359 can receive the sensor data from the sensor set 344 from the SoC 352 via the data interface 361. Repeater 359 can aggregate and convert the sensor data received from sensor set 344 and sensor 340 before forwarding the aggregated sensor data to the converter 324 of the primary ECU 320.

Converter 324 and repeater 329 of the primary ECU 320 can be grouped together as the sensor data distributor 323. The grouping can be a logical grouping of functionality implemented using separate components and circuitry. In other embodiments, the converter 324 and repeater 329 can be implemented as a physically combined component or circuitry of sensor data distributor 323. Similarly, converter 354 and repeater 359 of the backup ECU 350 can be grouped together as the sensor data distributor 353. The grouping can be a logical grouping of functionality implemented using separate components and circuitry. In other embodiments, the converter 354 and repeater 359 can be implemented as a physically combined component or circuitry of sensor data distributor 353.

In some embodiments, the sensors 310 and 340, and sensor sets 314 and 344 can be cameras and the sensor data can be camera data, and can be processed according to an image or video processing data interface and protocol, including, but not limited to, CSI, DSI, and eDP. In alternate embodiments, sensor data from sensor 310 can be first transmitted to the SoC 322, which aggregates the sensor data from sensor 310 with the sensor data from sensor set 314 before transmitting the aggregated sensor data to the repeater 329 via a data connection 331. The same process can be repeated in the backup ECU 350 for sensor 340 and sensor set 344 via data interface 361. The data interfaces 330, 331, 332, 360, 361, and 362 are shown as dashed lines in FIG. 3 to represent the different embodiments. As shown in the illustrated embodiment, the links 315 and 316, link sets 316 and 346, and bridging communication links 376 and 377 can be implemented using a LVDS data interface over a data communication medium, e.g., coaxial cable, twisted pair wire, fiber optic cable, trace.

Figures 4A, 4B:
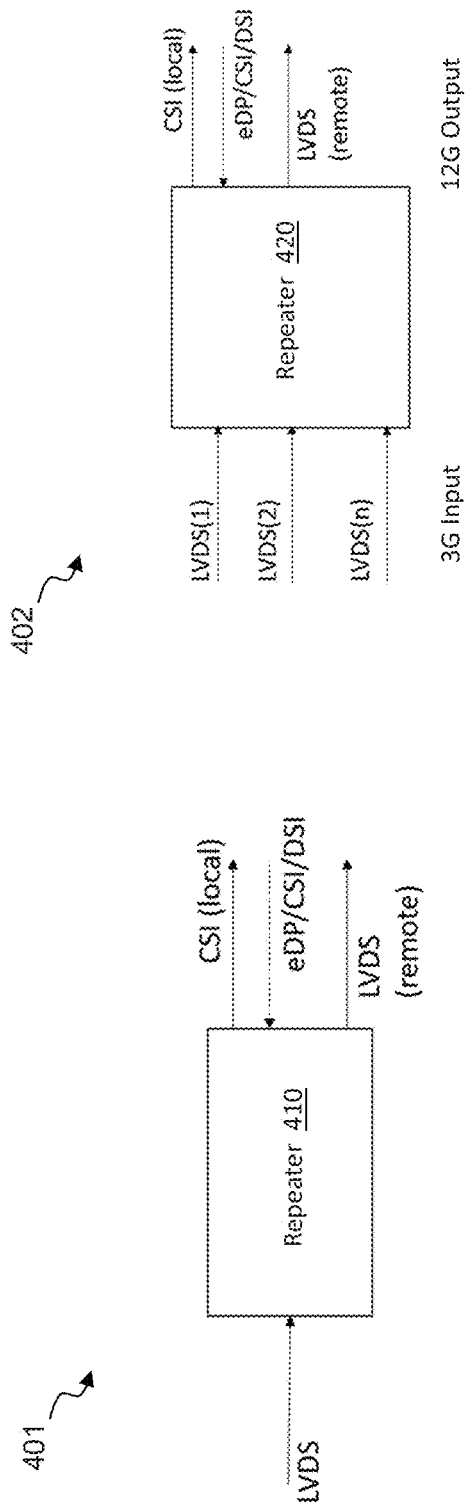
FIG. 4A is an illustration of a diagram of an example repeater system that can be used in FIG. 3.
FIG. 4B is an illustration of a diagram of an example repeater system that includes an aggregation capability.

FIG. 4A is an illustration of a diagram of an example repeater system 401 that can be used in system 300 of FIG. 3. As depicted, a repeater 410 can be implemented to receive as input serialized data from a first sensor, such as sensor 310 from FIG. 3, through a link, such as LVDS data interface. Repeater 410 can convert the serialized data to a SoC-native data interface before transmission to the local SoC via the CSI data interface. The input sensor data may also be forwarded off-board using another serialized data connection, such as the LVDS data interface.

The Repeater 410 can receive sensor data and other instructions from the SoC, such as through a data interface of type eDP, CSI, or DSI. The SoC can issue instructions through these data interfaces, such as a means to synchronize the various sensors, for example, to ensure all of the cameras take an image simultaneously to allow the images to be stitched together to form a wider field of view image, such as a 360-degree view surrounding the vehicle.

Figure 5:
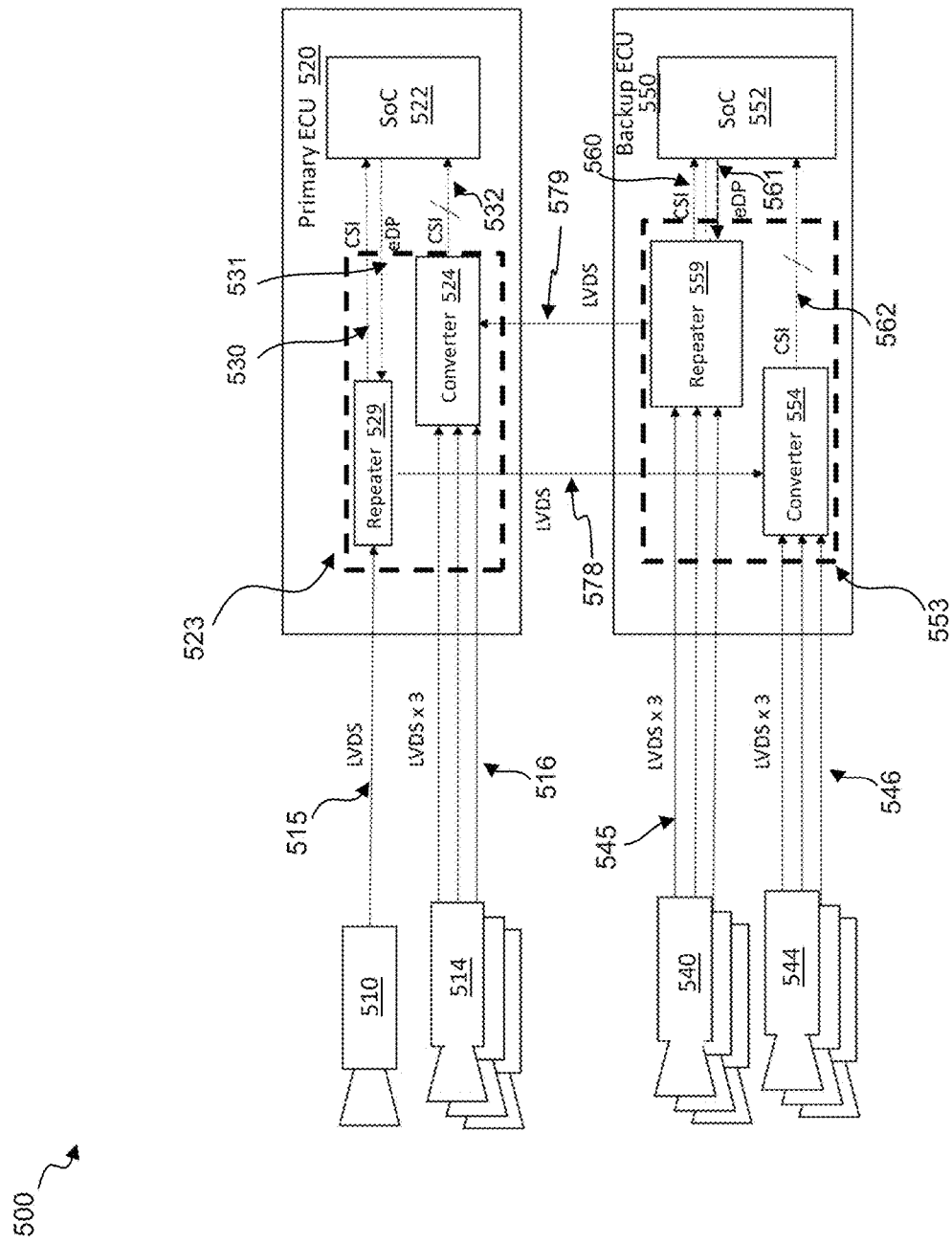
FIG. 5 is an illustration of a diagram of an example system to share sensor data using converters and aggregation repeaters.

FIG. 4B is an illustration of a diagram of an example repeater system 402 that includes an aggregation capability that can be used in system 500 of FIG. 5. The repeater 420 can receive one or more sets of sensor data over one or more links, where each link can support one or more channels or virtual channels, such as over the multiple LVDS data interface links The repeater 420 can aggregate the received sensor data and convert the sensor data to a SoC-native data interface before transmitting the converted data to the local SoC, such as through the CSI data interface.

In an alternative embodiment repeater 420 can also receive sensor data from a SoC, such as through the eDP, CSI, or DSI data interface. The repeater 420 can then aggregate the sensor data received from all sources before outputting the aggregated sensor data, such as through the bridging communication link LVDS. In repeater system 402, repeater 420 is receiving 3 gigabytes (Gb) of input data from each link and outputting a single link of 12 Gb of data. The aggregated sensor data can be re-converted to a data interface more suitable for transmission over distances, e.g., a serialized communication data interface, before transmission to another controller. Repeater 420 can also receive data and instructions from a SoC for processing via a data interface, such as an eDP, CSI, or DSI. The instructions can be used to synchronize various sensors.

FIG. 5 is an illustration of a diagram of an example system 500 to share sensor data using converters and aggregation repeaters. System 500 is a block diagram of the system for sharing sensor data between multiple ECUs with an enhanced repeater that takes inputs from multiple sensors and aggregates them into a single, higher data rate output channel. The repeater of system 500 is demonstrated by, for example, the repeater 420 of FIG. 4B. System 500 includes a single sensor 510, a sensor set 514, a sensor set 540, and a sensor set 544. Sensor 510 and sensor set 514 are communicatively connected via link 515 and link set 516, respectively, to an ECU, designated as a primary ECU 520. Sensor set 540 and sensor set 544 are communicatively connected via link sets 545 and 546 to an ECU designated as a backup ECU 550. In some embodiments, the sensors 510 and sensor sets 514, 540, and 544 can be cameras and the sensor data can be camera data, and can be processed according to an image or video processing data interface and protocol, including, but not limited to, CSI, DSI, and eDP.

Primary ECU 520 includes SoC 522, a repeater 529, and a converter 524. Backup ECU 550 includes a SoC 552, a converter 554, and a repeater 559. The system 500 includes data connections and interfaces similar to FIG. 3. For example, system 500 includes data interfaces 530, 531, 532, 560, 561, and 562 specified for short distance/high data rates. System 500 also includes bridging communication links 578 and 579 specified for longer distances. System 500 is similar to system 300 with the following differences.

Converter 524 and repeater 529 of the primary ECU 520 can be grouped together as the sensor data distributor 523. The grouping can be a logical grouping of functionality implemented using separate components and circuitry. In other embodiments, the converter 524 and repeater 529 can be implemented as a physically combined component or circuitry of sensor data distributor 523. Similarly, converter 554 and repeater 559 of the backup ECU 550 can be grouped together as the sensor data distributor 553. The grouping can be a logical grouping of functionality implemented using separate components and circuitry. In other embodiments, the converter 554 and repeater 559 can be implemented as a physically combined component or circuitry of sensor data distributor 553.

In backup ECU 550, repeater 559 is receiving multiple sensor data from sensor set 540. Repeater 559 can aggregate the multiple sensor data. The aggregated sensor data can be communicated over the bridging communication link 579 using a data interface to the converter 524. In addition, the aggregated sensor data is being communicated over a separate data interface 560 to SoC 552. The aggregation of sensor data can save transmission bandwidth and reduce the time to transmit the complete set of aggregated sensor data since the sensor data sets can be sent at the same time rather than waiting for one of the sensor data sets to be sent first. Repeater 559 can produce a second aggregated sensor data using the previously aggregated sensor data and sensor data received from SoC 552 via data interface 561. The sensor data received from SoC 552 can be received from the sensor set 544 and sent to the SoC via the data interface 562.

Data interfaces 530, 532, 560, and 562 are using the CSI data interface in this example. Data interfaces 531 and 561 are using the eDP data interface in this example Data interfaces 530, 531, 532, 560, 561, and 562 can be instantiated using various link types, such as a trace. Link 515 and link sets 516, 545, and 546, and bridging communication links 578 and 579 are instantiations of a data interface, such as a type of the LVDS data interface using a communication medium. The communication medium, e.g., physically implemented, can be implemented as a coaxial cable, fiber optic cable, twisted pair wire, Ethernet, trace, or other link types. Each of the links (and data interfaces) can comprise one or more channels or virtual channels.

Figure 6:
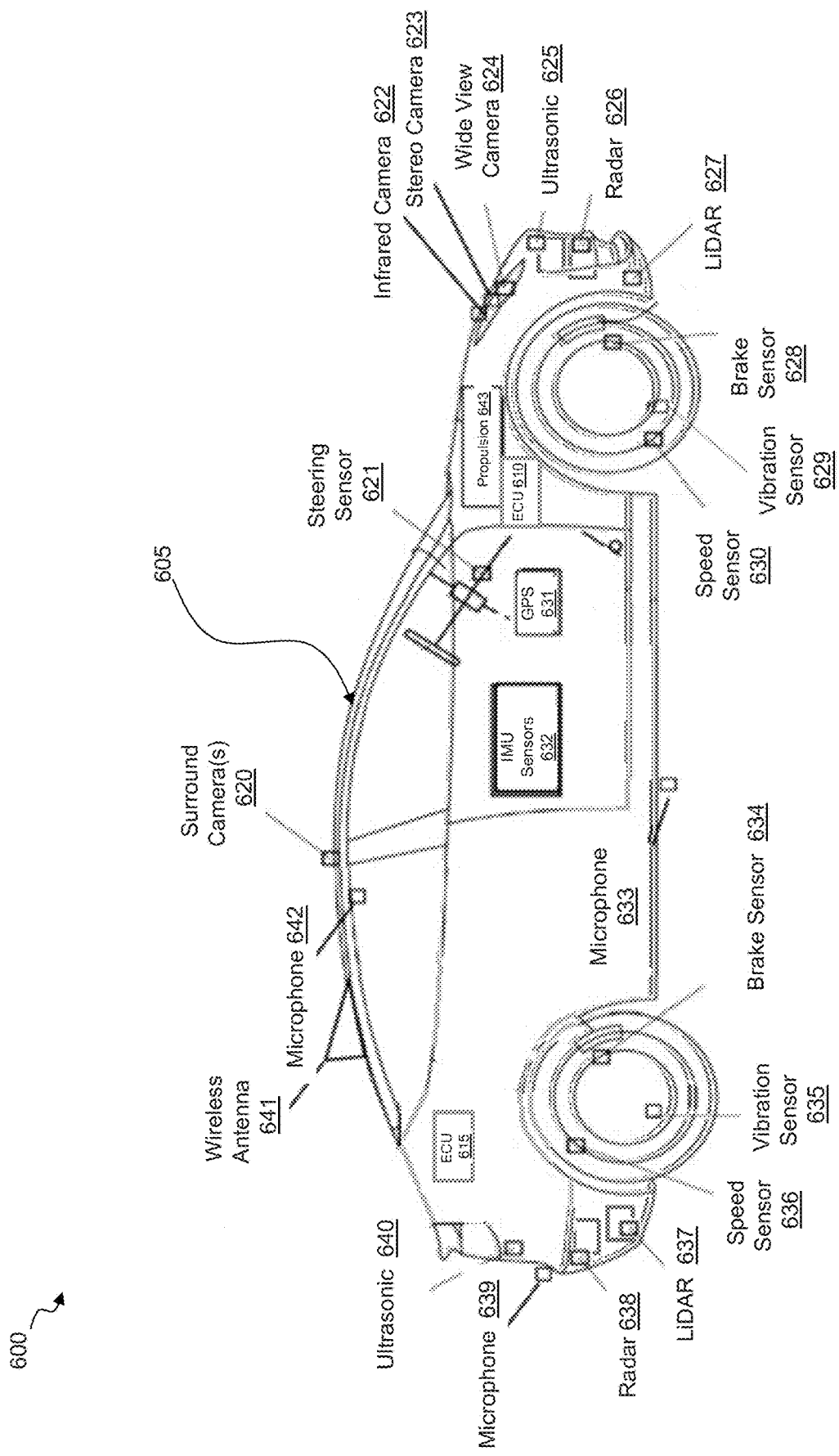
FIG. 6 is an illustration of a diagram of an example autonomous vehicle demonstrating potential placement of sensors and controllers.

FIG. 6 is an illustration of a diagram of an example autonomous vehicle 600 demonstrating potential placement of sensors and controllers, upon which various embodiments of the present disclosure can be implemented. Vehicle 605 in the example shown comprises a passenger vehicle such as a car or truck that can accommodate a human driver and/or human passengers. One or more controllers 610 and 615, such as ECUs, provide autonomous self-driving capabilities in response to signals continuously provided in real time from an array of sensors, as described more fully below.

Each controller 610 and 615 can operate in real-time to process sensor signals and output autonomous operation commands to vehicle 605 and/or assist the human vehicle driver in driving. Each vehicle 605 can have various numbers of distinct controllers for functional safety and additional features. The controllers 610 and 615, or other controllers, can typically send signals via the CAN bus, a network inside modern cars used to control brakes, acceleration, steering, windshield wipers, etc. The CAN bus can be configured to have dozens of nodes, each with its own unique identifier (CAN ID). Other protocols can be used for communicating within a vehicle, including FlexRay and Ethernet.

Controllers 610 and 615 provide autonomous driving outputs in response to an array of sensor inputs including, for example: one or more ultrasonic sensors 625 and 640, one or more RADAR sensors 626 and 638, one or more LIDAR sensors 627 and 637, one or more surround cameras 620, one or more stereo cameras 623 (in preferred embodiments, at least one such stereo camera faces forward to provide depth-perception for object detection and object recognition in the vehicle path), one or more infrared cameras 622, one or more wide view or fisheye cameras 624, GPS unit 631 that provides location coordinates, a steering sensor 621 that detects the steering angle, speed sensors 630 and 636 (one for each of the wheels), a brake sensor 628 and 634 (one for each of the wheels), an IMU 632 that monitors movement of vehicle body (this sensor can be for example an accelerometer(s) and/or a gyrosensor(s) and/or a magnetic compass(es)), tire vibration sensors 629 and 635 (one for each of the wheels), and microphones 633, 639, and 642 placed around and inside the vehicle. Other sensors can monitor the propulsion system 643 and can receive data from wireless antenna 641, for example, weather information or traffic conditions. Other sensors can be used, as is known to persons of ordinary skill in the art.

According to one or more embodiments, vehicle 605 includes a plurality of cameras 620, 622, 623, and 624, capturing images around the entire periphery of the vehicle 605. Camera type and lens selection depends on the nature and type of function. The vehicle 605 preferably has a mix of camera types and lenses to provide complete coverage around the vehicle 605. In one or more embodiments, the vehicle 605 includes twelve cameras, although a greater or lesser number may be used. All camera locations on the vehicle preferably support LVDS and GbE.

Figure 7:
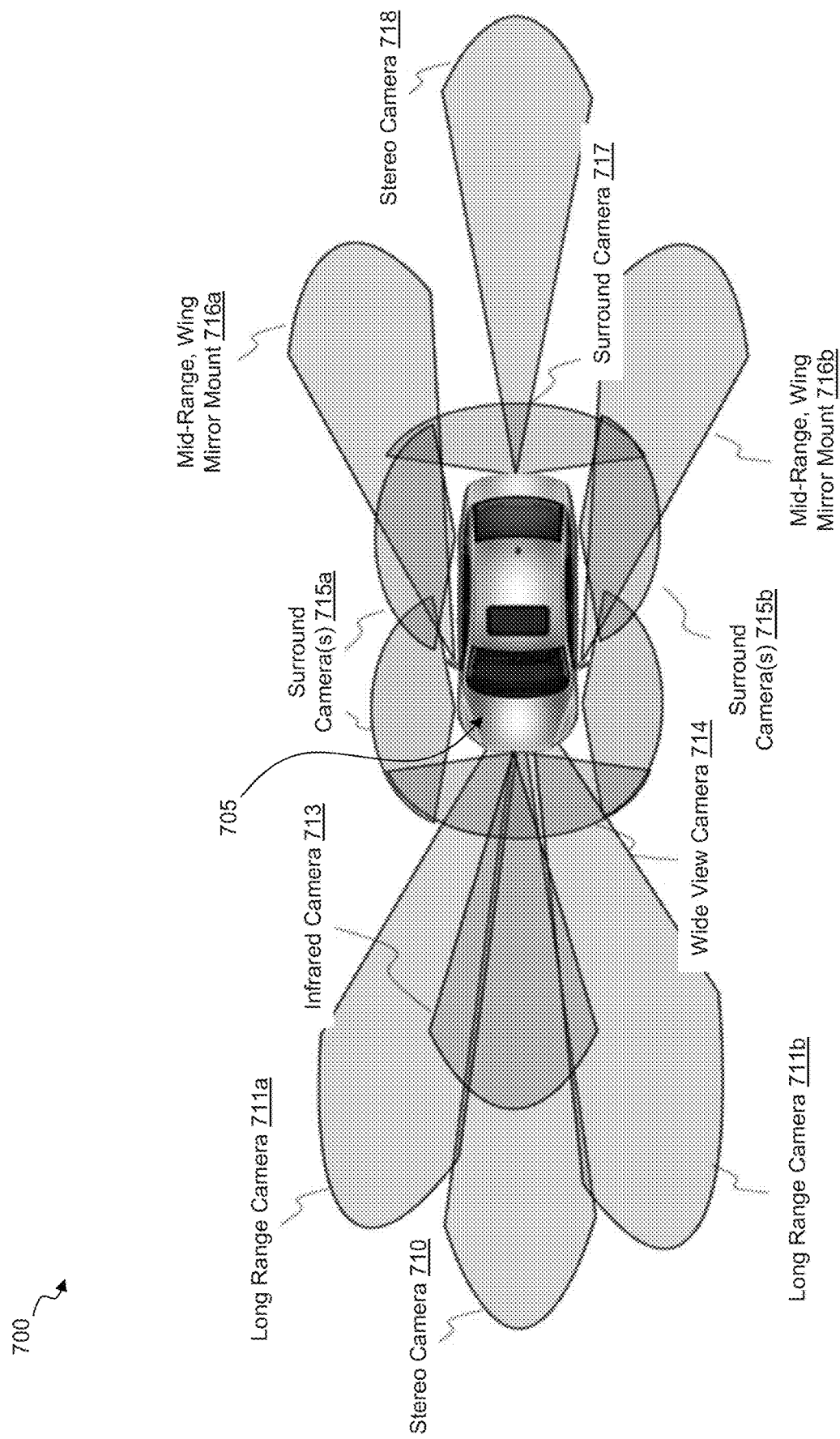
FIG. 7 is an illustration of a diagram of an example camera system of a vehicle.

FIG. 7 is an illustration of a diagram of an example camera system 700 of a vehicle 705. Camera system 700 demonstrates one example of camera types and locations, with twelve cameras 710, 711a, 711b, 714, two of 715a, two of 715b, 716a, 716b, 717, and 718, and one infrared camera 713. In a preferred embodiment, cameras record and provide video information simultaneously. Vehicle 705 preferably includes one or more LIDAR sensors as well.

Vehicle 705 can have two ECUs. One ECU can receive sensor data, for example, from cameras 710, 711a, 711b, 713, 714, and 715a. The second ECU can receive sensor data, for example, from cameras 715b, 716a, 716b, 717, and 718. This setup can lead to the shortest distance between the cameras and the respective ECU. The ECUs can include a converter, repeater, and SerDes components as described herein to be able to forward camera sensor data received at one ECU to another ECU.

One ECU can be designated as the primary ECU and be primarily responsible for controlling the vehicle 705. The other ECU can be designated as the backup ECU can take over primary responsibility upon a failure condition occurring in the primary ECU. This can provide the redundancy and component failure support required to meet the safety and control requirements. Other combinations are possible, such as having more than two ECUs with the cameras distributed evenly, or having the camera sensor data distributed differently to each of the ECUs.

Figure 8:
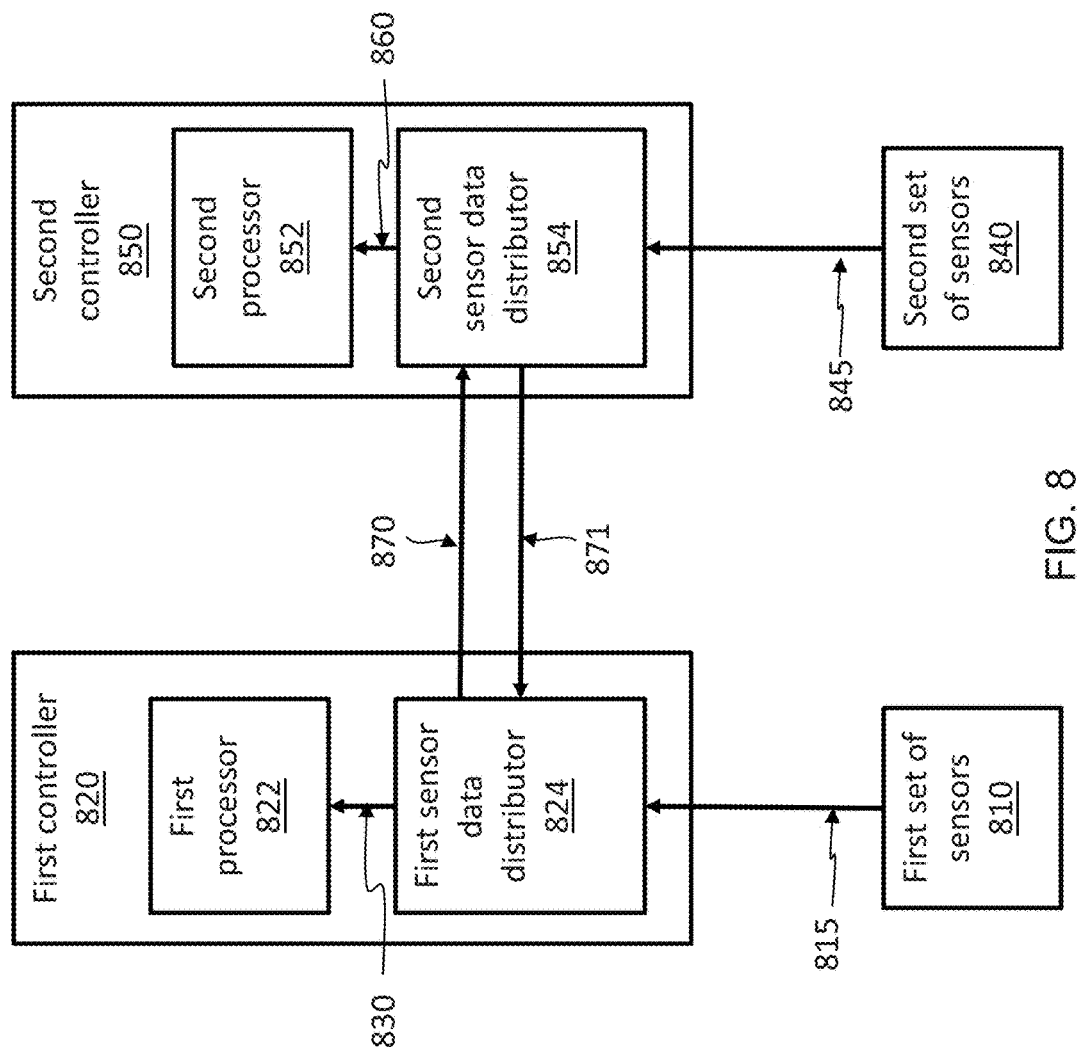
FIG. 8 is an illustration of a block diagram of an example vehicle system using sensor data distributors.

FIG. 8 is an illustration of a block diagram of an example vehicle system 800 using a sensor data distributor, such as converters. Similar to system 100 of FIG. 1, vehicle system 800 includes a first set of sensors 810, a first controller 820, a second set of sensors 840, and a second controller 850. The first controller 820 includes a first processor 822 and a first sensor data distributor 824. The second controller 850 includes a second processor 852 and a second sensor data distributor 854. In various embodiments, the first sensor data distributor 824 and the second sensor data distributor 854 can be, for example, converters, repeaters, SerDes, deserializers, serializers, and other circuitry to perform the actions described.

The first set of sensors 810 is communicatively coupled to the first sensor data distributor 824 via a link 815. The first sensor data distributor 824 can send one channel of the sensor data to the first processor 822 via a data interface 830, and a second channel of the sensor data to the second sensor data distributor 854 via bridging communication link 870. Likewise, the second set of sensors 840 is communicatively coupled to the second sensor data distributor 854 via a link 845. The second sensor data distributor 854 can send a third channel of the sensor data to the second processor 852 via a data interface 860 and a fourth channel of the sensor data to the first sensor data distributor 824 via the bridging communication link 871. In this configuration, the first controller 820 and the second controller 850 can each share the received sensor data. The data interfaces 830 and 860 can be CSI compliant data interfaces.

The first controller 820 and the second controller 850 can be an ECU, MCU, or another type of controller. First processor 822 and second processor 852 can be a SoC, CPU, GPU, another processor type, or a combination of one or more processors. First set of sensors 810 and second set of sensors 840 can be one or more of the aforementioned sensor types. In other embodiments, first sensor data distributor 824 and second sensor data distributor 854 can each aggregate sensor data received from more than one sensor from the respective first set of sensors 810 and second set of sensors 840. The aggregated sensor data can be further transmitted as a single data transmission thereby allowing multiple sensor data to be sent at the same time saving communication bandwidth and maintaining appropriate communication speed. The first and second sensor data distributors 824 and 854 can be a SerDes, and can optionally include additional deserializers and repeaters. The first sensor data distributor 824 can send deserialized sensor data over a first channel via the data interface 830 to the first processor 822, and serialized sensor data over a second channel via the bridging communication link 870 to the second sensor data distributor 854. The second sensor data distributor 854 can send deserialized sensor data over a third channel via the data interface 860 to the second processor 852, and serialized sensor data over a fourth channel via the bridging communication link 871 to the first sensor data distributor 824. In this configuration, the first controller 820 and the second controller 850 can each share the received sensor data.

Vehicle system 800 demonstrates two controllers. Additional controllers can be included as well within vehicle system 800. The links between the controllers can include connecting each controller to the other, or some of the controllers connecting to some other of the controllers using a connection pattern, such as a daisy chain pattern, tree pattern, or other connection patterns. Note that all arrows in FIGS. 1-5 and 8 indicate a typical directional flow of sensor data. In some embodiments, each instantiated link can also support bi-directional data flow. Data and instructions can be sent in the opposite direction as shown by the respective arrows. This can be used, for example, to provide instructions to the sensors or to synchronize the sensors to a time or event.

Figure 9:
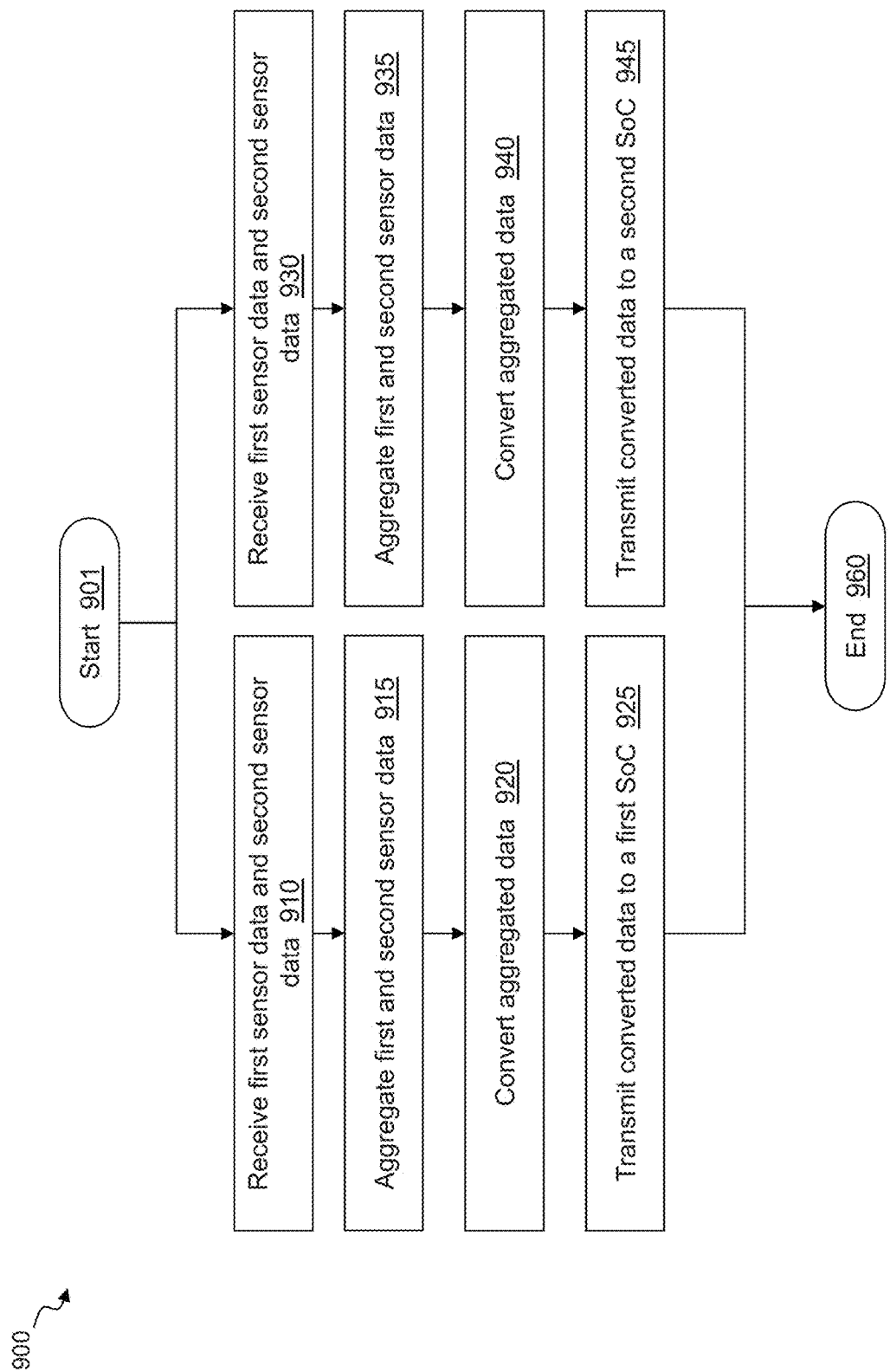
FIG. 9 is an illustration of a flow diagram of an example method for communicating sensor data between controllers.

FIG. 9 is an illustration of a flow diagram of an example method 900 for communicating sensor data to a controller of a vehicle. SerDes is used as an example of the various sensor data distributor circuits disclosed herein that can be used for communicating the data. Method 900 starts at a step 901 and proceeds in serial or parallel processing to steps 910 and/or 930 in various orders or combinations. Step 910 and its subsequent steps represent the functionality of a first controller in a vehicle. Step 930 and its subsequent steps represent the functionality of a second controller in the vehicle.

In step 910, a first SerDes receives sensor data. The sensor data can be received from a first set of sensors and a second SerDes. The sensors can be cameras such as the various types of cameras disclosed herein. First sensors can send first sensor data to the first SerDes and the second SerDes can forward second sensor data from second sensors to the first SerDes. In some embodiments, sensor data can be received from more than two sensor sets.

In a step 915, the one or more sensor data received can be aggregated. This can include aggregating one or more first sensors' data or aggregating the first sensor data with the second sensor data. In some embodiments, a third or additional sensor data can be aggregated with the first sensor data. In a step 920, the aggregated sensor data can be converted to a data interface suitable for transmission to a first SoC. The data interface for sending the data can be CSI for camera data. Other data interfaces can be used for other types of sensor data. In a step 925, the converted sensor data can be transmitted to the first SoC. The first SoC can be a local SoC that is on a same control board or controller, such as an ECU, of the first SerDes.

In the step 930, a second SerDes receives sensor data. The second SerDes can receive second sensor data from a second set of sensors and the first SerDes can forward first sensor data to the second SerDes. In a step 935, the one or more sensor data received can be aggregated. This can include aggregating one or more second sensors' data or aggregating the first sensor data with the second sensor data. In some embodiments, a third or fourth sensor data or additional sensor data can be aggregated with the second sensor data. In a step 940, the aggregated sensor data can be converted to a data interface suitable for transmission to a second SoC. In a step 945, the converted sensor data can be transmitted to the second SoC. The second SoC can be a local SoC with the second SerDes and the data interface for transmission can be CSI for camera data. The method 900 can end at a step 960 with the completion of both step 925 and step 945.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

As will be appreciated by one of skill in the art, the disclosure or parts thereof may be embodied as a method, system, or computer program product. Accordingly, the features disclosed herein, or at least some of the features, may take the form of an entirely hardware embodiment, an entirely software embodiment (including firmware, resident software, micro-code, etc.) or an embodiment combining software and hardware aspects all generally referred to herein as a "circuit" or "module." Some of the disclosed features may be embodied in or performed by various processors, such as digital data processors or computers, wherein the computers are programmed or store executable programs of sequences of software instructions to perform one or more of the steps of the methods. Thus, features or at least some of the features disclosed herein may take the form of a computer program product on a non-transitory computer-usable storage medium having computer-usable program code embodied in the medium. The software instructions of such programs can represent algorithms and be encoded in machine-executable form on non-transitory digital data storage media.

Thus, portions of disclosed examples may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include machine code, such as produced by a compiler, and files containing higher level code that may be executed by the computer using an interpreter.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A first controller for processing sensor data for a vehicle, comprising:
   a processor configured to process a first sensor data generated by at least one sensor; and
   a sensor data distributor configured to receive the first sensor data through a first link of a first data interface, convert the first sensor data for transmission through a second data interface, transmit the converted first sensor data to the processor employing a first link of the second data interface, and transmit the first sensor data to a second controller through a second link of the first data interface, wherein the first data interface is a low voltage differential signaling (LVDS) interface and the second data interface comprises a deserialized data interface.

2. The first controller as recited in claim 1, wherein the first sensor data is generated by a first set of sensors and the sensor data distributor is configured to aggregate the first sensor data as first aggregate sensor data, and transmit the first aggregate sensor data to the second controller through the second link of the first data interface and to the processor through the first link of the second data interface.

3. The first controller as recited in claim 1, wherein the sensor data distributor is configured to aggregate the first sensor data and a second sensor data generated by a second set of sensors as a second aggregate sensor data.

4. The first controller as recited in claim 3, wherein the second sensor data is received from the second controller through a second link of the first data interface.

5. The first controller as recited in claim 4, wherein the sensor data distributor comprises at least one first serializer-first deserializer set (first SerDes), wherein the first deserializer is configured to receive the first sensor data through the first link of the first data interface, and transmit the first sensor data to the processor through the first link of the second data interface and to the first serializer through a second link of the second data interface, and the first serializer is configured to transmit the first sensor data to the second controller through a third link of the first data interface.

6. The first controller as recited in claim 5, wherein the sensor data distributor further comprises a second deserializer configured to receive the second sensor data through the second link of the first data interface, and to transmit the second sensor data to the processor through a third link of the second data interface.

7. The first controller as recited in claim 5, wherein the second data interface is a camera serial interface (CSI) or a mobile industry processor interface (MIPI).

8. The first controller as recited in claim 1, wherein the sensor data distributor comprises:
   a first set of repeaters configured to receive a third sensor data generated by a third set of sensors received through a fourth link of the first data interface, and to transmit the third sensor data to the processor through a fourth link of the second data interface and to the second controller through a fifth link of the first data interface.

9. The first controller as recited in claim 8, wherein the first set of repeaters is configured to aggregate the third sensor data as a third aggregate sensor data and transmits the third aggregate sensor data to the processor through the fourth link of the second data interface and to the second controller through the fifth link of the first data interface.

10. The first controller as recited in claim 8, wherein the first set of repeaters is configured to receive the first sensor data from the processor through a first link of a third data interface, aggregate the first sensor data and the third sensor data as a fourth aggregate sensor data, and to transmit the fourth aggregate sensor data to the second controller through the fifth link of the first data interface.

11. The first controller as recited in claim 10, wherein the third data interface is an embedded display port (eDP) interface.

12. The first controller as recited in claim 1, wherein the first controller and the second controller are embedded control units (ECU) of a vehicle.

13. The first controller as recited in claim 1, wherein the second data interface is a camera serial interface (CSI).

14. The first controller as recited in claim 1, wherein the second data interface is instantiated using a circuit trace, and the first data interface is instantiated using a link comprising at least one of a coaxial cable, fiber optic cable, or twisted pair wire.

15. The first controller as recited in claim 1, wherein the second data interface comprises at least one of: one or more physical channels, or one or more virtual channels of a physical channel.

16. The first controller as recited in claim 1, wherein the at least one sensor is selected from the group of sensors consisting of:
 a LiDAR sensor,
 an ultrasonic sensor,
 a camera,
 a high-resolution camera,
 an artificial intelligence camera,
 an infrared sensor,
 a global positioning system (GPS) sensor, and
 a RADAR sensor.

17. The first controller as recited in claim 1, wherein the vehicle is at least one of: an autonomous, semi-autonomous, or a technology assisted vehicle, and the first controller and the second controller support operating the vehicle.

18. A vehicle control system of a vehicle, comprising:
 a first controller, located as part of the vehicle, comprising a first processor, and communicatively connected to a first set of sensors which generate a first sensor data; and
 a second controller, located as part of a vehicle, comprising a second processor, wherein the first and second processors are configured to process sensor data and the first controller transmits the first sensor data to the second controller, and wherein the second controller transmits the second sensor data to the first controller.

19. The vehicle control system as recited in claim 18, wherein the second controller is communicatively connected to a second set of sensors.

20. The vehicle control system of claim 19, wherein the first set of sensors is substantially discrete from the second set of sensors.

21. The vehicle control system of claim 19, wherein at least one of the first and second set of sensors includes at least one sensor selected from the group of sensors consisting of:
 a LiDAR sensor,
 an ultrasonic sensor,
 a camera,
 a high-resolution camera,
 an artificial intelligence camera,
 an infrared sensor,
 a global positioning system (GPS) sensor, and
 a RADAR sensor.

22. The vehicle control system as recited in claim 19, wherein the first controller transmits the first sensor data to the second controller through a first bridging communication link using a first data interface, and the second controller transmits the second sensor data through a second bridging communication link using a second data interface.

23. The vehicle control system as recited in claim 22, wherein the first set of sensors is communicatively connected to the first controller through a third link using a third data interface, and the second set of sensors is communicatively connected to the second controller through a fourth link using a fourth data interface.

24. The vehicle control system as recited in claim 23, wherein the third data interface and the fourth data interface each comprise a plurality of virtual channels, the plurality of virtual channels corresponding to a number of sensors comprised in the respective first set of sensors or second set of sensors.

25. The vehicle control system as recited in claim 18, wherein the first controller further comprises a deserializer.

26. The vehicle control system as recited in claim 18, wherein the first controller and the second controller are embedded control units (ECU) comprised within an autonomous vehicle control (AVC) board.

27. The vehicle control system as recited in claim 18, wherein the vehicle is an autonomous, semi-autonomous, or technology assisted vehicle.

28. The vehicle control system as recited in claim 18, wherein each of the first processor and the second processor comprises at least one of: a system on a chip (SoC), a central processing unit (CPU), or a graphics processing unit (GPU).

29. The vehicle control system as recited in claim 18, wherein the first controller further comprises a first repeater configured to transmit the first sensor data to the second controller and to the first processor.

30. A method for communicating sensor data between controllers of an advanced driver assistance (ADA) system, the method comprising:
 receiving, in a first controller of a vehicle, first sensor data generated by a first set of sensors and second sensor data generated by a second set of sensors;
 converting the first and second sensor data for transmission through a first data interface; and
 transmitting the first and second sensor data employing the first data interface to a first system on a chip (SoC) of the first controller, wherein the second sensor data is transmitted to the first controller from a second controller of the vehicle, and the second controller has a position that is physically diverse from a position of the first controller in the vehicle.

31. The method as recited in claim 30, wherein the first sensor data and the second sensor data is aggregated prior to the converting and transmitting.

32. The method as recited in claim 30, wherein the receiving, converting, and transmitting are performed by a sensor data distributor of the first controller.

33. The method as recited in claim 32, wherein the sensor data distributor includes one or more of a converter, repeater, or serializer/deserializer set (SerDes).

34. The method as recited in claim 30, wherein the first controller and the second controller are embedded control units (ECUs).

35. The method as recited in claim 30, wherein the receiving the second sensor data comprises receiving the second sensor data by a first deserializer from a second serializer of the second controller through a second data interface communicatively coupling the first deserializer with the second serializer,
 wherein the receiving the first sensor data by the second controller comprises receiving the first sensor data by a second deserializer of the second controller from a first serializer of the first controller through a third data interface communicatively coupling the first serializer with the second deserializer, and
 wherein at least one of the second data interface and the third data interface corresponds to a differential serial communications protocol.

36. The method as recited in claim 35, wherein the first sensor data or the second sensor data are aggregated sensor data from one or more sets of sensors.

37. The method as recited by claim 30, wherein the receiving the first sensor data by the first controller comprises:
- receiving, by a first repeater of the first controller, third sensor data generated by a third set of sensors;
- passing, by the first repeater, the third sensor data to at least one deserializer of the second controller;
- converting the third sensor data to a second aggregated sensor data; and
- transmitting the second aggregated sensor data to the first SoC.

38. The method as recited by claim 30, further comprising:
- receiving, in the second controller, the first sensor data from the first controller;
- converting, in the second controller, the first sensor data and the second sensor data to a fourth data interface; and
- transmitting the first and second sensor data through the fourth data interface to a second SoC of the second controller.

* * * * *